June 19, 1956     F. E. MARSH ET AL     2,751,508
ELECTRICAL SYSTEM FOR MOTOR VEHICLES
Filed March 16, 1953     2 Sheets-Sheet 1

INVENTORS.
FAYETTE E. MARSH
IRVEN W. MCROBERTS
IRL W. ANSPACH
BY Flournoy Corey
         ATTORNEY.

June 19, 1956  F. E. MARSH ET AL  2,751,508
ELECTRICAL SYSTEM FOR MOTOR VEHICLES
Filed March 16, 1953  2 Sheets-Sheet 2
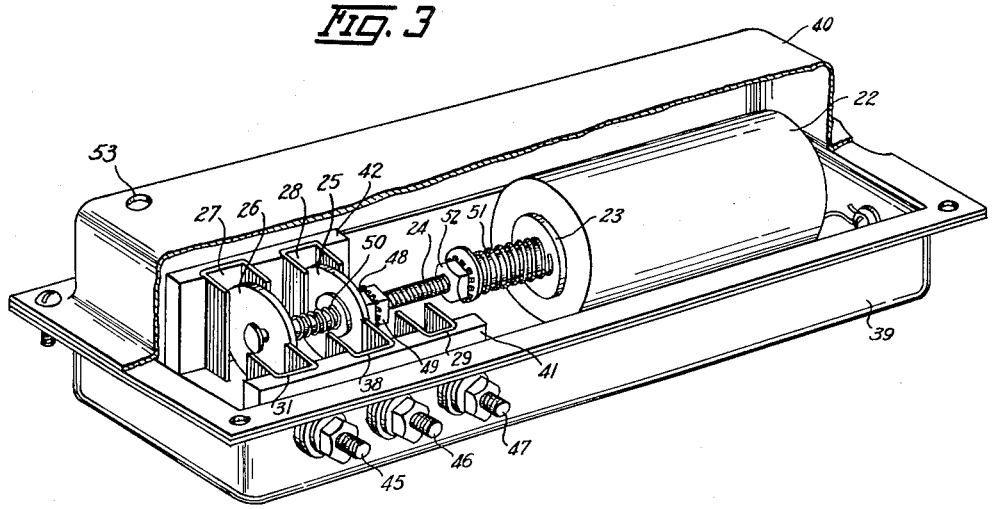
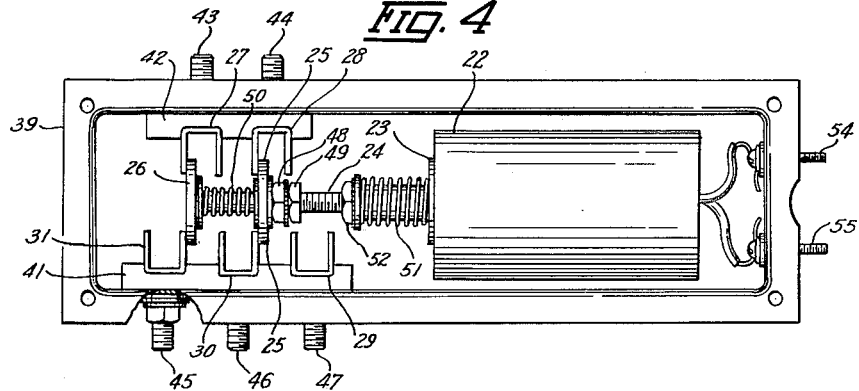
INVENTORS.
FAYETTE E. MARSH
IRVEN W. MCROBERTS
IRL W. ANSPACH
BY Flournoy Corey
ATTORNEY.

United States Patent Office 2,751,508
Patented June 19, 1956

2,751,508

ELECTRICAL SYSTEM FOR MOTOR VEHICLES

Fayette Elam Marsh, Irl W. Anspach, and Irven Wilbur McRoberts, Hastings, Nebr., assignors, by mesne assignments, to Wyatt Manufacturing Company, a corporation of Kansas Application March 16, 1953, Serial No. 342,334

3 Claims. (Cl. 307—10)

This invention relates to material handling methods and devices and has particular relation to a hydraulic dump mechanism powered by conventional automotive storage batteries and to the circuits and switches employed therein.

It has long been realized that it would be desirable to provide a hydraulic dump box for automotive vehicles and the like which would not require direct connection to the vehicle engine by gear boxes and drive shafts which require adaptations and changes in the motor vehicle itself. It has been apparent that a system powered by a common storage battery would be desirable, but it is also realized that the standard storage battery has a very short life under these conditions. This is particularly true in cold weather when the efficiency of a storage battery drops rapidly.

Our invention is directed to an electrical system which will allow the storage battery of the motor vehicle to be used in conjunction with a second storage battery to furnish power for the hydraulic mechanism of a dump box or the like, and particularly to a switch which will allow these two batteries to be connected in series or parallel manner as conditions may require.

It is a further object of our invention to provide an electrical circuit and switch which will permit two automotive storage batteries to be recharged simultaneously by an automotive generator.

It is still another object of our invention to provide an electrical system in which the actuation of a manual switch will automatically cause an increase in voltage in the circuit and the starting of an electric motor.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 3 is a view in perspective of a switch constructed according to our invention, a portion of the top cover being cut away to show the internal mechanism, and, Figure 4 is a top view, with the cover removed, of the switch shown in Figure 3, further showing the nature of the mechanism therein.

Figure 1:
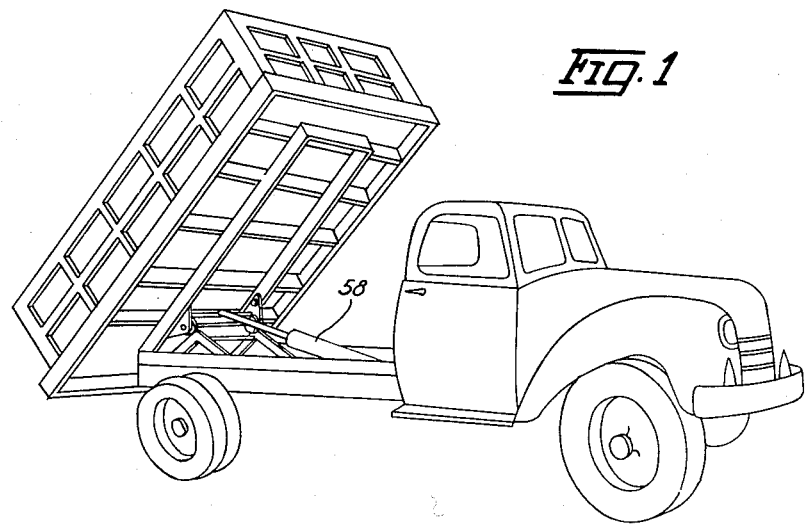
Figure 1 is a view in perspective showing a motor truck having a hydraulic dump box mounted thereon and shown in an elevated position.
Figure 2:
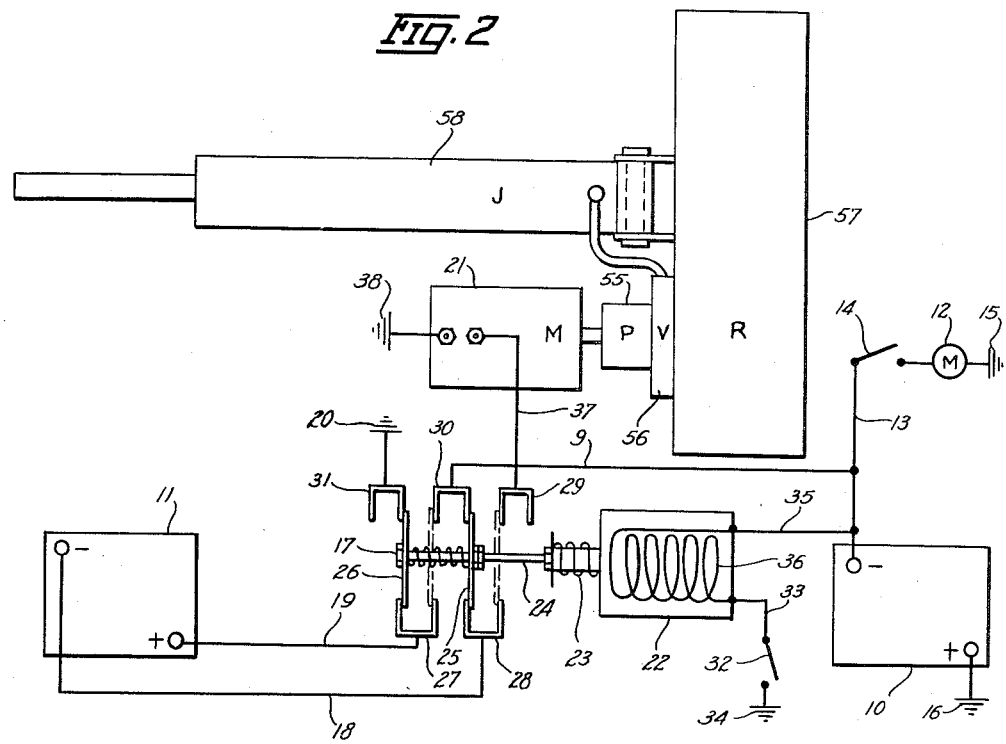
Figure 2 is a schematic diagram of the hydraulic system and electrical circuit used to operate the dump box shown in Figure 1, and particularly shows the two possible positions of the solenoid operated electric switch used therein.

Referring now to the drawings, and more particularly to Figure 2 thereof; in practicing our invention, we provide two common six volt storage batteries, one of which we will designate as the truck battery 10 and the other we will designate as the hoist battery 11. The truck battery furnishes electrical energy to the truck motor 12 through the wire 13 and ignition switch 14, the circuit being completed by grounding the motor at 15 and the truck battery at 16. It will also be realized that it is common practice to provide an automotive engine with a generator or charger, not shown, which serves to recharge the battery whenever the engine or motor exceeds a given speed.

It is obvious that it is desirable to utilize this automotive generator to recharge the hoist battery 11 as well as the truck battery. In order to achieve this result, it is necessary to connect the two batteries in a parallel relationship with the motor driven generator of the truck. This is done by connecting the negative pole of the truck battery through wires 13, 9, switch 17, including electrode 30 and 28 and disc 25, and wire 18 with the negative pole of the hoist battery. The positive poles of the two batteries are connected by the grounding of the truck battery at 16, and the grounding of the positive pole of the hoist battery through wire 19, switch 17, including electrodes 27 and 31 and disc 26, and ground 20. It is of course obvious that the connections described will not only permit both batteries to be recharged by the same generator, but will make both batteries available for the operation of the truck motor and other electrical accessories.

One of the principal advantages of using two batteries is to provide 12 volt service for the hoist motor 21. This is accomplished by the use of the switch 17 which we will now describe in detail. A switch constructed according to our invention comprises a solenoid 22 having a core 23 which is connected to a shaft 24. Mounted on this shaft 24 are two circular copper discs 26 and 25, which are insulated to prevent any electrical contact between the discs and the shaft. Five U-shaped copper electrodes are provided to contact the copper discs.

Referring to Figure 2, the two possible positions of the shaft and discs are shown. The solid lines represent the discs when the solenoid is at rest. It will be noted that they are then in contact with electrodes 27 and 28 on one side and electrodes 30 and 31 on the other, and in a position to set up a parallel relationship between batteries 10 and 11.

To energize the solenoid 22, switch 32 is closed, completing a circuit from the truck battery 10 through wires 13 and 35, the solenoid coil 36, and wire 33 to ground 34. This action causes the discs to move to the position shown by the dotted lines in Figure 2. It will now be seen that the two batteries have been placed in a series relationship.

The negative pole of the truck battery 10 is now connected to the positive pole of the hoist battery 11 by wires 13 and 9, electrode 30, disc 26, electrode 27, and wire 19. The negative pole of the hoist battery 11 is connected to the positive pole of the truck battery by being grounded at 38. This grounding is provided by a circuit through wire 18, electrode 28, disc 25, electrode 29, wire 37, and the motor 21 to the ground 38.

Referring now to Figures 3 and 4; we will describe a suggested construction of a switch built according to an embodiment of our invention. A case 39 having a cover 40 is provided to contain the mechanism which includes the previously mentioned solenoid 22, shaft 24, discs 25 and 26, and electrodes 27, 28, 29, 30 and 31. The electrodes are U-shaped and so positioned that the flanges extend into the path of movement of the discs 25 and 26. These electrodes are mounted within the case so that electrodes 27 and 28 are in a staggered relationship to electrodes 29, 30 and 31 on the opposite side of the case. The discs are so positioned on the shaft that disc 25 moves between the flanges of U-shaped electrode 28 on one side and between the adjacent flanges of electrodes 29 and 30 on the other side. Similarly, disc 26 moves between the flanges of the electrode 27 on one side, and between the adjacent flanges of electrodes 30 and 31 on the other. The electrodes are mounted on insulating blocks 41 and 42 and have outside terminals 43, 44, 45, 46 and 47 connected thereto.

To assure constant contact between the discs and the electrodes, discs 25 and 26 are preferably loosely mounted on the shaft 24 and held in position by nut 48 and lock nut 49. A spring 50 is provided between discs 25 and 26 which will permit the slight movement of both discs and yet bias them towards the electrodes. A spring 51 is also mounted on the shaft 24 and held in position by a nut 52 which can be used to vary the tension of the spring. This assembly serves to hold the solenoid in an open position when the solenoid is not subject to an electrical current. The solenoid is provided with terminals 54 and 55 to permit outside connections to be made. The cover 40 of the switch box is provided with a mounting hole 53.

From the foregoing description it will be apparent that we have provided an electrical circuit and a switch which enables that circuit to selectively connect two common storage batteries in a parallel relationship to provide six volt current or to connect the two batteries in a series relationship to provide twelve volt power for an electric motor or the like.

It is also to be noted that the operation of a single switch 32 will cause the change in the circuit from six to twelve volts and actuate the motor 21 which will in turn drive the pump 55 which moves the hydraulic fluid from the reservoir 57 through the valve 56 into the hydraulic jack 58. It will be apparent that once the switch is closed, a constant power hydraulic pump will be set in operation and that the flow of fluid in the hydraulic system can be controlled by the valve.

Although we have described a specific embodiment of our invention, and have described it in particular reference to its use in a hydraulic dump truck, it is quite apparent that a machine or machines of entirely different kind may be provided with an electric circuit and switch of the type described. It will also be understood that modifications of the herein described electric circuit and switch may be made without departing from the spirit and scope of the present invention as set forth in the appended claims.

We claim as our invention:

1. In a motor driven unit of the type described having a storage battery, a second storage battery, a switch comprising a pair of U-shaped electrodes mounted on one side thereof and three U-shaped electrodes mounted opposite said first pair of electrodes and in a staggered relation thereto, solenoid operated means comprising a pair of circular disks movably disposed between said opposed electrodes to provide selective electrical engagement thereof, means connecting one of said batteries to the said pair of electrodes, means connecting the other storage battery with two of the three aforementioned electrodes, and an electric motor operatively connected to the third of said three electrodes.

2. In an electric switch, a solenoid, a shaft extending from said solenoid and having a pair of disks resiliently mounted thereon, a pair of U-shaped electrodes operatively connected to a power source and adapted to contact one edge of said disks, a plurality of U-shaped electrodes adapted to contact the other edge of said disks two of said electrodes being operatively connected to a second power source, said opposed electrodes being positioned in a staggered relation in such a manner as to permit said disks to alternately contact the inner flanges of said pair of U-shaped electrodes and the adjacent outer flanges of said plurality of said U-shaped electrodes whereby movement of said disks between said opposed electrodes will cause the polarity relationship of the two power sources to be reversed.

3. In an electrical switch, a case, a pair of U-shaped electrodes on one side of the case, a second group of three U-shaped electrodes on the opposite side of said case and in an offset relation thereto, a pair of resiliently mounted disks positioned to move between the U-shaped portion of the first mentioned pair of electrodes on one side and the adjacent surfaces of the second mentioned electrodes on the other side to establish alternate connection between said opposed electrodes, the first pair of electrodes being connected to the opposite poles of a single power source, the outermost electrodes of the three electrodes being connected to a second power source and the center electrode being connected to a power driven unit whereby lateral movement of the two disks will cause the two power sources to be connected in parallel or alternately to be connected in series to the aforementioned motor.

References Cited in the file of this patent

UNITED STATES PATENTS

| | | |
|---|---|---|
| 983,976 | Carpenter | Feb. 14, 1911 |
| 985,509 | Carpenter | Feb. 28, 1911 |
| 1,689,075 | Lehman | Oct. 23, 1928 |
| 1,847,097 | Noffs | Mar. 1, 1932 |
| 2,335,526 | Mitchell | Nov. 30, 1943 |
| 2,344,568 | Snyder | Mar. 21, 1944 |

FOREIGN PATENTS

| | | |
|---|---|---|
| 470,495 | Germany | Jan. 18, 1924 |